United States Patent
Kim et al.

(10) Patent No.: US 9,256,107 B2
(45) Date of Patent: Feb. 9, 2016

(54) LIQUID CRYSTAL DISPLAY AND METHOD OF MANUFACTURING THE SAME

(75) Inventors: In-Woo Kim, Suwon-si (KR); Yi Li, Yongin-si (KR); Jang-Il Kim, Asan-si (KR); Seong-Jun Lee, Seoul (KR); Eun Cho, Cheonan-si (KR); Seon-Hong Ahn, Suwon-si (KR); Seung-Hyun Hur, Cheonan-si (KR); Jae-Young Lee, Yongin-si (KR); Ji-Hyeon Son, Seongnam-si (KR); Jae-Yong Shin, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 537 days.

(21) Appl. No.: 12/481,858

(22) Filed: Jun. 10, 2009

(65) Prior Publication Data

US 2010/0157186 A1     Jun. 24, 2010

(30) Foreign Application Priority Data

Dec. 22, 2008    (KR) .................. 10-2008-0131380

(51) Int. Cl.
*G02F 1/1343*    (2006.01)
*G02F 1/1362*    (2006.01)
*G02F 1/139*     (2006.01)

(52) U.S. Cl.
CPC .... *G02F 1/134336* (2013.01); *G02F 1/136213* (2013.01); *G02F 1/1393* (2013.01)

(58) Field of Classification Search
USPC .................................... 349/39, 144
See application file for complete search history.

(56) References Cited

U.S. PATENT DOCUMENTS

| | | | | |
|---|---|---|---|---|
| 6,406,928 | B1 * | 6/2002 | Jen et al. ................... | 438/30 |
| 7,130,012 | B2 * | 10/2006 | Doi et al. .................. | 349/187 |
| 8,570,477 | B2 * | 10/2013 | Kataoka et al. ............ | 349/143 |
| 2002/0159018 | A1 * | 10/2002 | Kataoka et al. ............ | 349/143 |
| 2005/0099582 | A1 * | 5/2005 | Doi et al. .................. | 349/187 |
| 2005/0110924 | A1 * | 5/2005 | Kim et al. .................. | 349/111 |
| 2007/0024789 | A1 * | 2/2007 | Itou et al. .................. | 349/139 |
| 2008/0030636 | A1 * | 2/2008 | Huang et al. .............. | 349/38 |
| 2010/0157186 | A1 * | 6/2010 | Kim et al. .................. | 349/39 |

FOREIGN PATENT DOCUMENTS

| | | |
|---|---|---|
| KR | 1019990003542 | 1/1999 |
| KR | 1020000062990 | 10/2000 |
| KR | 1020010039664 | 5/2001 |
| KR | 1020040031786 | 4/2004 |
| KR | 1020050058053 | 6/2005 |
| KR | 1020060080843 | 7/2006 |
| KR | 20100072852 A * | 7/2010 |

* cited by examiner

*Primary Examiner* — Andrew Jordan
(74) *Attorney, Agent, or Firm* — Cantor Colburn LLP

(57) ABSTRACT

A liquid crystal display includes a first substrate and a second substrate facing the first substrate, a gate line and a data line disposed on the first substrate, and a pixel electrode disposed on the first substrate. The pixel electrode is connected to the gate line and the data line, and includes subregions. The liquid crystal display further includes a storage electrode disposed on the first substrate overlapping the pixel electrode to form a storage capacitor, a common electrode disposed on the second substrate, and a liquid crystal layer interposed between the pixel electrode and the common electrode and including liquid crystal molecules disposed therein. The pixel electrode includes a stem defining boundaries between the subregions, and a width of the stem changes from a center portion of the pixel electrode to a peripheral portion of the pixel electrode.

12 Claims, 8 Drawing Sheets

LIQUID CRYSTAL DISPLAY AND METHOD OF MANUFACTURING THE SAME

This application claims priority to Korean Patent Application No. 10-2008-0131380, filed on Dec. 22, 2008, and all the benefits accruing therefrom under 35 U.S.C. §119, the contents of which in its entirety are herein incorporated by reference.

BACKGROUND OF THE INVENTION

1. Field of the Invention

The present invention relates to a liquid crystal display and, more particularly, the present invention relates to a liquid crystal display having a substantially improved response speed and viewing angle.

2. Description of the Related Art

Liquid crystal displays ("LCDs") are widely used as flat panel displays. An LCD typically includes two display panels on which field generating electrodes, such as pixel electrodes and a common electrode, are disposed, and a liquid crystal layer interposed between the two display panels. In the LCD, voltages are applied to the field generating electrodes to generate an electric field in the liquid crystal layer, and an alignment of liquid crystal molecules in liquid crystal layer is thereby controlled. Accordingly, a polarization of incident light is controlled to display an image on the LCD.

An LCD which utilizes a vertical alignment ("VA") mode has been developed. In the VA mode LCD, major axes of the liquid crystal molecules are arranged to be substantially perpendicular to the display panel when an electric field is not applied to the liquid crystal layer.

In the VA mode LCD, a viewing angle is increased by forming cutouts, such as slits and/or protrusions, for example, in the field-generating electrodes. Since the cutouts and/or protrusions determine tilt directions of the liquid crystal molecules, the tilt directions can be distributed in various different directions such that a reference viewing angle is widened.

However, when forming the cutouts, irregular textures are generated in regions where an influence of the inclination direction determination member, e.g., the cutouts, is decreased, such as near edges of a pixel area, or in region where mutual influences of the inclination direction determination members are applied, such as near a central portion of the pixel area. As a result, a display quality of the LCD occurs due to the irregular textures.

The LCD generally includes a storage capacitor to maintain a pixel voltage of the pixel electrode. When a gate-on voltage is applied to a thin film transistor of the LCD, charges are charged into the liquid crystal layer, which is typically an optical-electric active layer, and the charges are maintained until another gate-on voltage is applied to the thin film transistor. When changing from the gate-on voltage to a gate-off voltage, however, the pixel voltage drops. Thus, the storage capacitor reduces the pixel voltage drop to reduce a range of fluctuation thereof to maintain a substantially constant pixel voltage. Therefore, a capacitance of the storage capacitor in the LCD should be as large as possible.

However, when a size of a storage electrode is increased, to increase the capacitance of the storage capacitor, an aperture ratio of the LCD, e.g., a ratio of an area of one pixel through which light is transmitted to a total area of the one pixel is decreased.

BRIEF SUMMARY OF THE INVENTION

Exemplary embodiments of the present invention provide a liquid crystal display having a substantially improved response speed and viewing angle and substantially reduced and/or effectively minimized irregular texture. Exemplary embodiments also provide a liquid crystal display having a substantially increased storage capacitance without a reduction of an aperture ratio of the liquid crystal display.

A liquid crystal display according to an exemplary embodiment includes: a first substrate and a second substrate facing the first substrate; a gate line and a data line disposed on the first substrate; a pixel electrode disposed on the first substrate, connected to the gate line and the data line, and including subregions; a storage electrode disposed on the first substrate overlapping the pixel electrode to form a storage capacitor; a common electrode disposed on the second substrate; and a liquid crystal layer interposed between the pixel electrode and the common electrode and including liquid crystal molecules disposed therein. The pixel electrode includes a stem defining boundaries between the subregions, and a width of the stem changes from a center portion of the pixel electrode to a peripheral portion of the pixel electrode.

The stem may include a longitudinal stem and/or a transverse stem, and the pixel electrode may further include branches extending from the one of the longitudinal stem and the transverse stem toward the peripheral portion of the pixel electrode.

The width of the stem may decrease from the central portion of the pixel electrode to the peripheral portion of the pixel electrode.

The pixel electrode may further include branches extending from the stem toward the peripheral portion of the pixel electrode.

Lengths of two or more of the branches in each of the subregions may be different from each other.

The liquid crystal molecules may be pretilted such that a longitudinal axis of the liquid crystal molecules in each of the subregions is aligned substantially parallel to the lengths of the two or more of the branches therein.

An alignment layer may be disposed on the pixel electrode or the common electrode, and the alignment layer may be aligned substantially parallel to the lengths of the two or more of the branches.

The pixel electrode may include an outer connection surrounding the peripheral portion of the pixel electrode.

The branches of the pixel electrode may be connected to the outer connection.

The storage electrode may include a transparent conductive layer.

A storage electrode line may be disposed in a same layer as the gate line and be connected to the storage electrode.

In an alternative exemplary embodiment, a method of fabricating a liquid crystal display includes: disposing a first substrate to face a second substrate; forming a gate line and a data line on the first substrate; forming a pixel electrode having subregions on the first substrate; connecting the pixel electrode to the gate line and the data line; forming a storage capacitor having a transparent conductive layer by overlapping a storage electrode with the pixel electrode on the first substrate; forming a common electrode on the second substrate; and disposing a liquid crystal layer including liquid crystal molecules between the pixel electrode and the common electrode. The pixel electrode includes a stem defining boundaries between the subregions, and a width of the stem changes from a center portion of the pixel electrode a peripheral portion of the pixel electrode. The stem may include one of a longitudinal stem and a transverse stem, the width of the stem decreases from the center portion of the pixel electrode to the peripheral portion of the pixel electrode, and the pixel electrode may further include branches extending from the one of the longitudinal stem and the transverse stem toward the peripheral portion of the pixel electrode.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
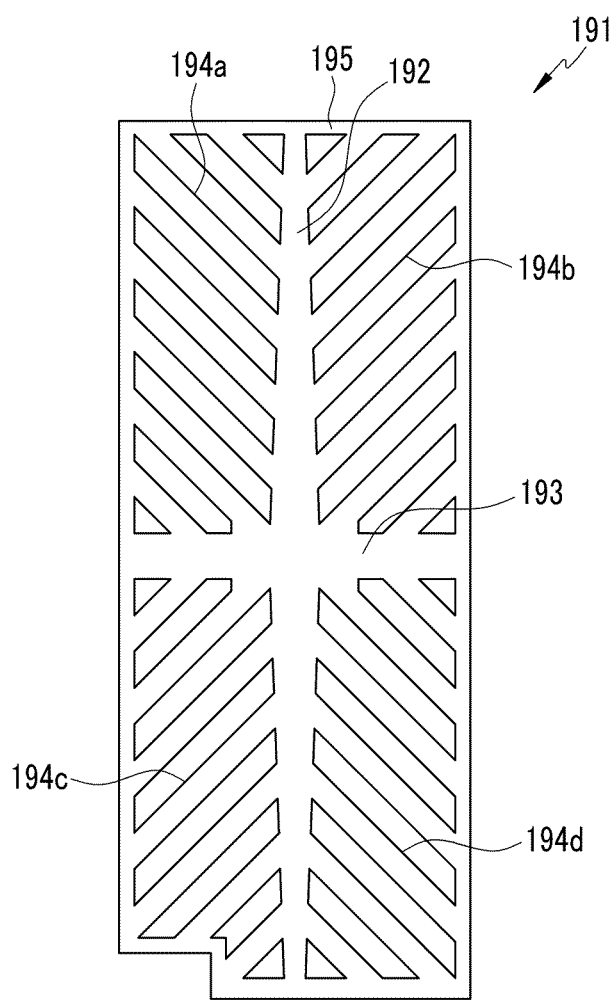
FIG. 1 is a plan view of an exemplary embodiment of a pixel electrode of a liquid crystal display according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments will be described in further detail with reference to the accompanying drawings.

Figure 2:
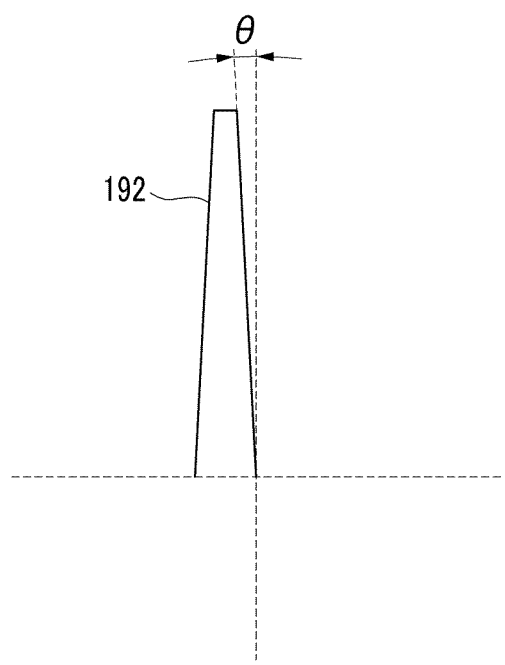
FIG. 2 is an enlarged view of a portion of an exemplary embodiment of a pixel electrode of a liquid crystal display according to the present invention.

A shape of a pixel electrode of a liquid crystal display according to an exemplary embodiment will now be described in further detail with reference to FIGS. 1 and 2. FIG. 1 is a plan view of an exemplary embodiment of a pixel electrode of a liquid crystal display according to the present invention, and FIG. 2 is an enlarged view of a portion of an exemplary embodiment of a pixel electrode of a liquid crystal display according to the present invention.

Referring to FIG. 1, a shape of a periphery of pixel electrode 191 in a liquid crystal display according to an exemplary embodiment is a quadrangle, and the pixel electrode 191 includes a stem having a transverse stem 193 and a longitudinal stem 192 crossing the transverse stem 193 and an outer connection 195 enclosing edges thereof. The pixel electrode 191 further includes a first branch 194*a*, a second branch 194*b*, a third branch 194*c* and a fourth branch 194*d* connected to the transverse stem 193, the longitudinal stem 192, and the outer connection 195, and extending in different directions from the stem.

More specifically, the first branch 194a extends obliquely from the transverse stem 193 or the longitudinal stem 192 in an upper left direction as viewed in FIG. 1, and the second branch 194b extends obliquely from the transverse stem 193 or the longitudinal stem 192 in an upper right direction. The third branch 194c extends obliquely from the transverse stem 193 or the longitudinal stem 192 in a lower left direction, and the fourth branch 194d extends obliquely from the transverse stem 193 or the longitudinal stem 192 in a lower right direction.

The first branch 194a, the second branch 194b, the third branch 194c and the fourth branch 194d may form an angle of about 45 degrees or about 135 degrees with the outer connection 195, and two neighboring branches of the first branch 194a, the second branch 194b, the third branch 194c and the fourth branch 194d may be substantially perpendicular to each other.

A width of the longitudinal stem 192 decrease closes to the outer connection 195 from the transverse stem 193 of the pixel electrode 191. In an alternative exemplary embodiment, however, the width of the transverse stem 193 of the pixel electrode 191 may decrease closer to the outer connection 195 from the longitudinal stem 192.

Thus, referring to FIG. 2, a width of the longitudinal stem 192 of the pixel electrode 191 decreases closer to the outer connection 195 from the transverse stem 193 such that a longitudinal side of the longitudinal stem 192 is inclined from a line substantially perpendicular to a periphery of the pixel electrode 191 by a predetermined angle θ. In an exemplary embodiment, the predetermined angle θ is in range of more than 0 degrees to less than about 2 degrees. In an alternative exemplary embodiment, the width of the transverse stem 193 of the pixel electrode 191 may decrease closer to the outer connection 195 from the longitudinal stem 192 such that a longitudinal side of the transverse stem 193 may be inclined with respect to the line substantially perpendicular to the periphery of the pixel electrode 191 by the predetermined angle θ.

Figure 3:
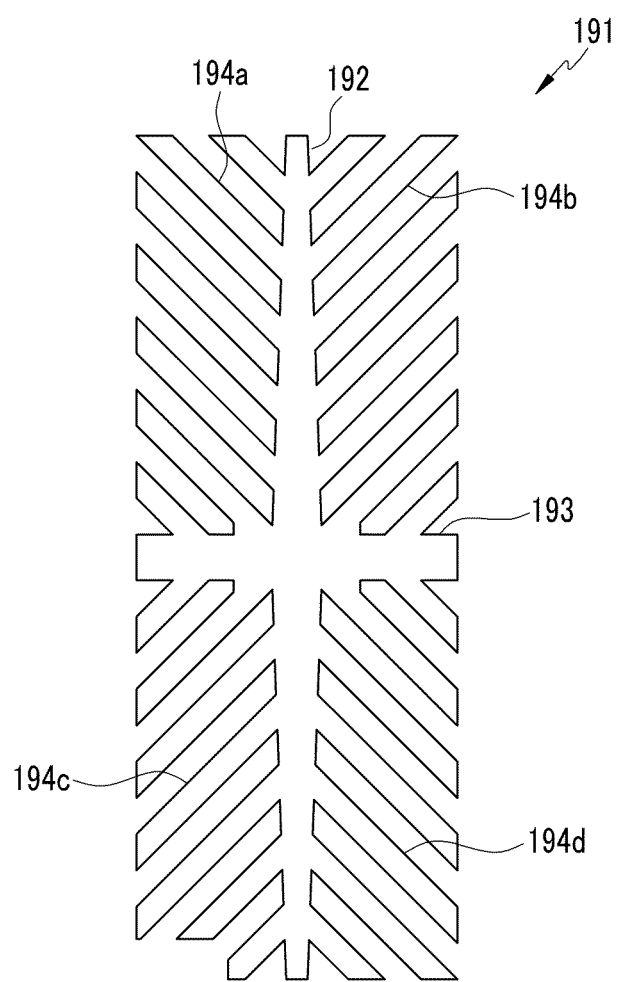
FIG. 3 is a plan view of an alternative exemplary embodiment of a pixel electrode of a liquid crystal display according to the present invention.

A shape of a pixel electrode of a liquid crystal display according to an alternative exemplary embodiment will now be described in further detail with reference to FIG. 3. FIG. 3 is a plan view of an alternative exemplary embodiment of a pixel electrode of a liquid crystal display according to the present invention.

The shape of the pixel electrode 191 shown in FIG. 3 is similar to as shown in FIG. 1. Specifically, a shape of a periphery of the pixel electrode 191 is a quadrangle, and the pixel electrode 191 includes a stem having a transverse stem 193 and a longitudinal stem 192, and a first branch 194a, a second branch 194b, a third branch 194c and a fourth branch 194d extending from the transverse stem 193 and the longitudinal stem 192 in different directions therefrom.

However, in contrast to the pixel electrode 191 according to the exemplary embodiment shown in FIG. 1, the pixel electrode 191 according to an alternative exemplary embodiment shown in FIG. 3 does not have the outer connection 195 for connecting the outer portions of the pixel electrode 191.

A width of the longitudinal stem 192 of the pixel electrode 191 shown in FIG. 3 decreases closes to the upper and lower outer portions of the pixel electrode 191 from the transverse stem 193. Accordingly, the outer line of the longitudinal stem 192 is inclined with respect to the outer line of the pixel electrode 191 by a predetermined angle θ (FIG. 2). In an exemplary embodiment, the predetermined angle θ of the outer line of the longitudinal stem 192 is in range of more than 0 degrees to less than about 2 degrees. In an alternative exemplary embodiment, the width of the transverse stem 193 of the pixel electrode 191 decreases closer to outer portions of the pixel electrode 191 from the longitudinal stem 192.

In an exemplary embodiment, the width of the longitudinal stem 192 of the pixel electrode 191 decreases closer to the upper and lower outer portions of the pixel electrode 191 from the transverse stem 193 such that the outer line of the longitudinal stem 192 is inclined with respect to the outer line of the pixel electrode 191 by the predetermined angle θ. However, according to an alternative exemplary embodiment, the width of the longitudinal stem 192 of the pixel electrode 191 may increase closer to the upper and lower outer portions of the pixel electrode 191 from the transverse stem 193, such that the outer line of the longitudinal stem 192 is inclined with respect to the outer line of the pixel electrode 191 by the predetermined angle θ.

Thus, in an exemplary embodiment, the pixel electrode 191 of the liquid crystal display includes a substantially cross-shaped stem having the transverse stem 193, the longitudinal stem 192, and the first branch 194a, the second branch 194b, the third branch 194c and the fourth branch 194d extending from the transverse stem 193 and the longitudinal stem 192 in different directions. Moreover, in an exemplary embodiment, an overall shape of a pixel electrode of a liquid crystal display is a quadrangle, and a plurality of branches extend in a horizontal direction and a vertical direction, and a stem connecting the branches divides the pixel electrode 191 into subregions. In addition, widths of the longitudinal stem 192 and the transverse stem 193 may increase or, alternatively, decrease from the stem toward the outer portion of the pixel electrode 191 such that the outer line of the stem is inclined with respect to a central line bisecting the stem by the predetermined angle θ. In an exemplary embodiment, the predetermined angle θ is in a range of more than 0 degrees and less than about 2 degrees.

A liquid crystal display according to an exemplary embodiment will now be described in further detail with reference to FIGS. 4 and 5.

Figure 4:
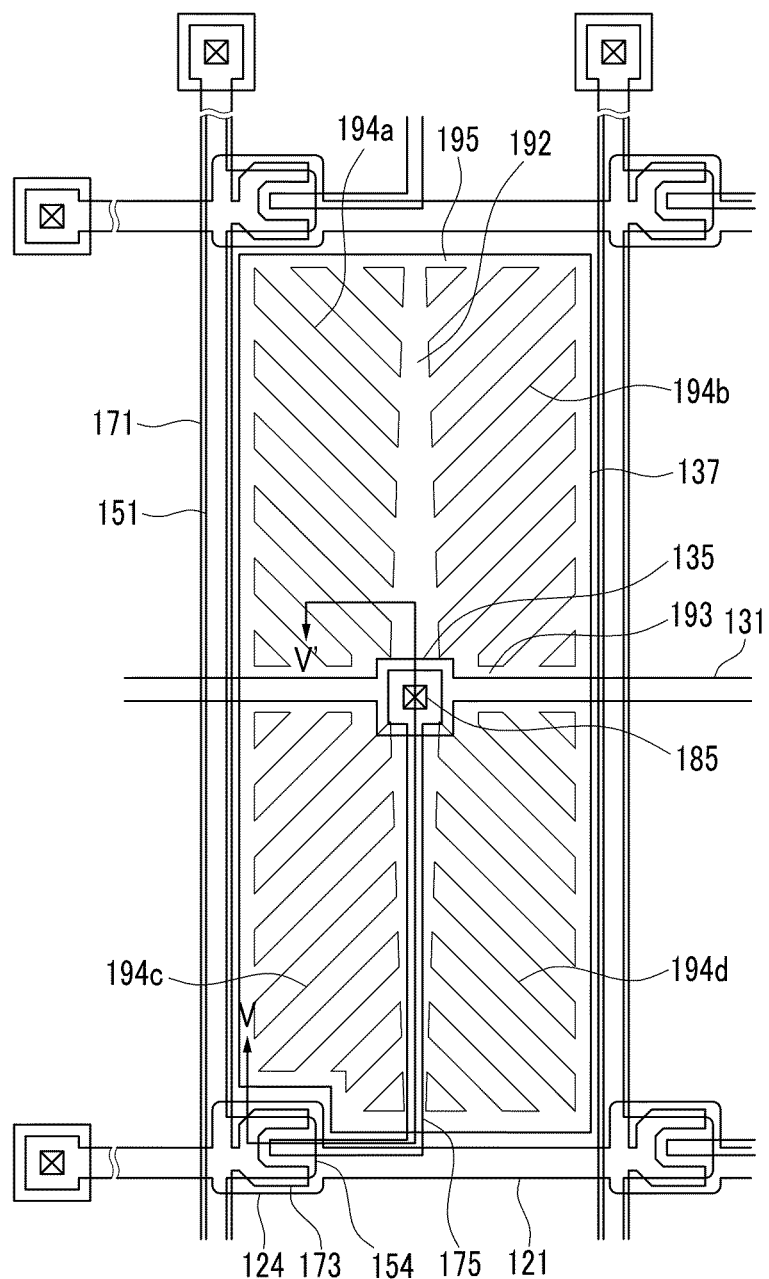
FIG. 4 is a layout view of an exemplary embodiment of a liquid crystal display according to the present invention.
Figure 5:
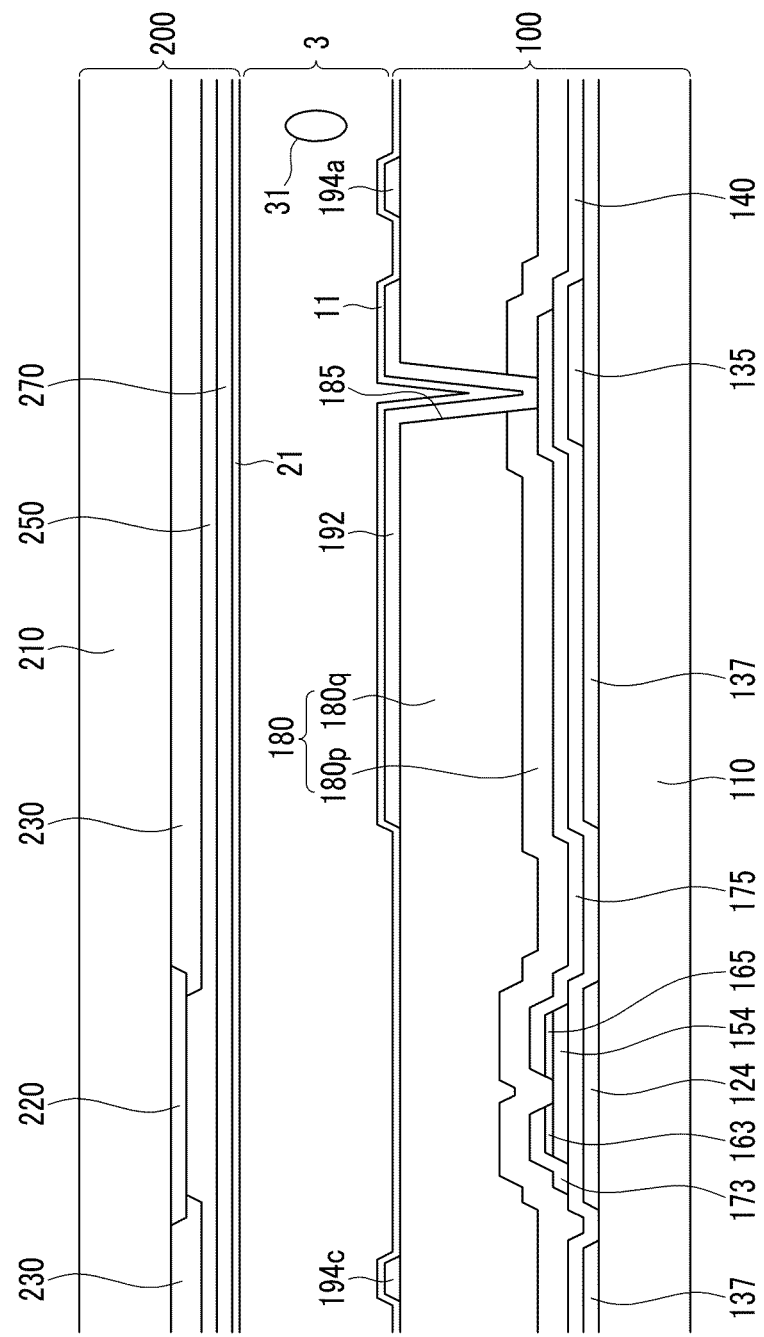
FIG. 5 is a partial cross-sectional view taken along line V-V' of FIG. 4.

FIG. 4 is a layout view of an exemplary embodiment of a liquid crystal display according to the present invention, and FIG. 5 is a partial cross-sectional view taken along line V-V' of FIG. 4.

A liquid crystal display according to an exemplary embodiment includes include a thin film transistor array panel 100 and a common electrode panel 200 facing the thin film transistor array panel 100, and a liquid crystal layer 3 disposed therebetween.

The thin film transistor array panel 100 will now be described in further detail.

Referring to FIGS. 4 and 5, storage electrodes 137 are disposed on an insulation substrate 110. In an exemplary embodiment, the storage electrodes 137 are made of a transparent conductive material such as indium tin oxide ("ITO") or indium zinc oxide ("IZO"), for example.

Gate lines 121 and storage electrode lines 131 are disposed on the substrate 110 and the storage electrodes 137.

The gate lines 121 transmit gate signals and extend in a substantially transverse direction. Each of the gate lines 121 includes gate electrodes 124 protruding substantially upward (as viewed in FIG. 4).

The storage electrode lines 131 extend substantially parallel to the gate lines 121, and are supplied with a predetermined voltage. Each storage electrode line 131 is disposed between two neighboring gate lines 121, and maintains a same distance from the two neighboring gate lines 121. The storage electrode line 131 includes an expansion 135 extending substantially upward and downward (as viewed in FIG. 4) and disposed in a central portion of the pixel electrode 191.

The storage electrode line 131 is disposed directly on the storage electrode 137 and is electrically connected to the storage electrode 137. The storage electrode 137 is supplied with the predetermined voltage from the storage electrode line 131.

In an alternative exemplary embodiment, a shape and arrangement of the storage electrode lines 131 may be different than as shown in FIGS. 4 and 5.

Semiconductor stripes 151 including hydrogenated amorphous silicon ("a-Si") or polysilicon, for example, are disposed on the gate lines 121 and the storage electrode line 131. The semiconductor stripes 151 generally extend in a substantially longitudinal direction, and include projections 154 which extended toward the gate electrodes 124.

Ohmic contact stripes (not shown) and ohmic contact islands 163 and 165 are disposed on the semiconductor stripes 151. The ohmic contact stripes and the ohmic contact islands 163 and 165 include a material such as n+ hydrogenated amorphous silicon in which an n-type impurity such as phosphor is doped with a high density, or, alternatively, may be made of silicide, but alternative exemplary embodiments are not limited thereto. The ohmic contact islands 163 and 165 are disposed in pairs on the projections 154 of the semiconductor stripes 151, as shown in FIG. 5.

Data lines 171 and drain electrodes 175 are disposed on the ohmic contact stripes and the ohmic contact islands 163 and 165 and a gate insulation layer 140.

The data lines 171 transfer data signals and extend substantially in the longitudinal direction, and intersect the gate lines 121 and the storage electrode lines 131. Each data line 171 includes source electrodes 173, shaped with a "C" shape, e.g., a curved shape, toward the gate electrode 124, and the source electrodes 173 are disposed opposite to, e.g., facing, the drain electrode 175 with respect to the gate electrodes 124.

Each drain electrode 175 includes an end portion which is relatively large and another end portion which has a bar shape. The relatively large end portion overlaps the expansion 135 of the storage electrode line 131, and the bar-shaped end portion is partially surrounded by the source electrode 173.

It will be noted that, in an alternative exemplary embodiment, a shape and arrangement of the drain electrodes 175 and the data lines 171 may be modified from as shown in FIGS. 4 and 5.

One gate electrode 124, one source electrode 173 and one drain electrode 175 comprise a thin film transistor ("TFT") together with the protrusion 154 of the semiconductor stripe 151. A channel of the TFT is disposed at the projection 154 between the source electrode 173 and the drain electrode 175.

The ohmic contact stripes and the ohmic contact islands 163 and 165 are disposed between the underlying semiconductor stripes 151 and the overlying data lines 171 and drain electrodes 175 to lower a contact resistance therebetween. A portion of each of the semiconductor stripes 151 is narrower than the data line 171, but as described above, the relatively wide portion of the semiconductor stripe 151 which meets the gate line 121 has a large width, thereby smoothing a profile of surface of the TFT array panel 100, so that disconnections of the data line 171 can be prevented. Some portions of each of the semiconductor stripe 151, including, for example, a portion between the source electrode 173 and the drain electrode 175, are exposed, e.g., are not covered by the data line 171 and the drain electrode 175.

A passivation layer 180 is disposed on the data lines 171, the drain electrodes 175 and the exposed portions of the semiconductor stripes 151.

In an exemplary embodiment, the passivation layer 180 includes an upper layer 180q made of an inorganic insulator such as silicon nitride or silicon oxide, and a lower layer 180p made of an organic insulator, for example. The organic insulator may include a flat surface and may have photosensitivity, and a dielectric constant thereof may be less than about 4.0. In an alternative exemplary embodiment, the passivation layer 180 may include a single-layered structure made of an inorganic insulator or an organic insulator, for example. The upper layer 180q of the passivation layer 180 may have a thickness of more than about 10 μm to substantially reduce coupling between the pixel electrode 191 and the data line 171 and to planarize the insulation substrate 110.

The passivation layer 180 has a contact hole 185 formed therein to expose the expansion of the drain electrode 175.

A plurality of the pixel electrodes 191 (FIG. 1) are disposed on the upper passivation layer 180q.

As described above, a shape of a periphery of the pixel electrode 191 is a quadrangle, and the pixel electrode 191 includes a cross-shaped stem having a transverse stem 193 and a longitudinal stem 192 crossing the transverse stem 193, as well as an outer connection 195 enclosing edges thereof. In addition, the pixel electrode 191 includes a first branch 194a, a second branch 194b, a third branch 194c and a fourth branch 194d connected to the transverse stem 193, the longitudinal stem 192, and the outer connection 195, and extending in different directions therefrom.

More specifically, the first branch 194a extends obliquely from the transverse stem 192a or the longitudinal stem 192 in an upper left direction, and the minute branch 194b extends obliquely from the transverse stem 193 or the longitudinal stem 192 in an upper right direction. Additionally, the third branch 194c extends obliquely from the transverse stem 193 or the longitudinal stem 192 in a lower left direction, and the fourth branch 194d extends obliquely from the transverse stem 193 or the longitudinal stem 192 in a lower right direction.

The first branch 194a, the second branch 194b, the third branch 194c and the fourth branch 194d may form an angle of about 45 degrees or about 135 degrees with the outer connection 195, and two neighboring branches of the first branch 194a, the second branch 194b, the third branch 194c and the fourth branch 194d may be substantially perpendicular to each other.

A width of the longitudinal stem 192 of the pixel electrode 191 decreases closer to the outer connection 195 from the transverse stem 193 such that a longitudinal side of the longitudinal stem 192 is inclined from a line substantially perpendicular to a periphery of the pixel electrode 191 by a predetermined angle θ (FIG. 2). In an exemplary embodiment, the predetermined angle θ is in range of more than 0 degrees to less than about 2 degrees. In an alternative exemplary embodiment, the width of the transverse stem 193 of the pixel electrode 191 may decrease closer to the outer connection 195 from the longitudinal stem 192 such that a longitudinal side of the transverse stem 193 may be inclined with respect to the line substantially perpendicular to the periphery of the pixel electrode 191 by the predetermined angle θ.

The pixel electrode 191 may include a transparent conductive material such as ITO or IZO, for example.

The pixel electrode 191 is physically and electrically connected to the drain electrode 175 through the contact hole 185, and receives a data voltage from the drain electrode 175.

A lower alignment layer 11 is disposed on the pixel electrode 191.

The common electrode panel 200 will now be described in further detail with reference to FIG. 5.

A light blocking member 220 is disposed on an insulation substrate 210. The light blocking member 220 may be a black matrix 220 which defines openings facing the pixel electrodes 191, and effectively prevents light leakage between the pixel electrodes 191.

Color filters 230 are disposed on the substrate 210, and are positioned inside openings surrounded by the light blocking member 220. The color filters 230 may extend along a longitudinal direction, e.g., along a column of the pixel electrodes 191, thereby forming a stripe. Each color filter 230 may display one of the primary colors, e.g., red, green or blue.

An overcoat 250 made of an organic material is disposed on the color filters 230 and the light blocking member 220. The overcoat 250 protects the color filters 230. In an alternative exemplary embodiment, the overcoat 250 may be omitted.

A common electrode 270, made of a transparent conductive material such as ITO or IZO, for example, is disposed on the overcoat 250, and an alignment layer 21 is disposed on the common electrode 270.

In an exemplary embodiment, the alignment layers 11 and 21 may be vertical alignment layers.

Polarizers (not shown) may be disposed on outer surfaces of the TFT array panel 100 and the common electrode panel 200.

The liquid crystal layer 3 according to an exemplary embodiment includes liquid crystal molecules 31. The liquid crystal molecules 31 may have a negative dielectric anisotropy. In an exemplary embodiment, the liquid crystal molecules 31 are pretilted, e.g., are aligned such that a longitudinal axis thereof is aligned substantially parallel to a length direction of the first branch 194a, the second branch 194b, the third branch 194c and the fourth branch 194d of the pixel electrode 191, and to be substantially perpendicular to the surface of the TFT array panel 100 and the common electrode panel 200. In an exemplary embodiment, the pixel electrode 191 has four subregions having pretilt directions which are different from each other.

As described above, each pixel electrode 191 is physically and electrically connected to the drain electrode 175 through the contact hole 185, and receives a data voltage from the drain electrode 175. The pixel electrode 191, supplied with the data voltages, generates an electric field along with the common electrode 270 of the common electrode panel 200 which receives a common voltage. Thus, the liquid crystal molecules 31 of the liquid crystal layer 3 change directions so that the major axes thereof become substantially perpendicular to the direction of the electric field in response to the electric field. The degree of change in a polarization of light incident to the liquid crystal layer 3 is changed according to a degree of inclination of the liquid crystal molecules 31, and this change of the polarization appears as a change of the transmittance by the polarizer, thereby displaying images on the liquid crystal display.

In an exemplary embodiment, edges of the first branch 194a, the second branch 194b, the third branch 194c and the fourth branch 194d distorts the electric field to make horizontal components substantially perpendicular to the edges of the first branch 194a, the second branch 194b, the third branch 194c and the fourth branch 194d, and the inclination direction of the liquid crystal molecules 31 is thereby determined by the horizontal components. Accordingly, the liquid crystal molecules 31 tend to tilt in a direction substantially perpendicular to the edges of the first branch 194a, the second branch 194b, the third branch 194c and the fourth branch 194d. However, the directions of the horizontal components of the electric field by a, respective neighboring first branch 194a, second branch 194b, third branch 194c and fourth branch 194d are opposite to each other, and intervals between the first branch 194a, the second branch 194b, the third branch 194c and the fourth branch 194d are narrow, such that the liquid crystal molecules 31 that are arranged in opposite directions are tilted in the directions substantially parallel to the length direction of the first branch 194a, the second branch 194b, the third branch 194c and the fourth branch 194d.

In an exemplary embodiment, the length directions in which the first branch 194a, the second branch 194b, the third branch 194c and the fourth branch 194d extend in a given pixel are four different directions, such that the inclined directions of the liquid crystal molecules 31 therein are in the four different directions. Therefore, a viewing angle of the liquid crystal display according to an exemplary embodiment is substantially improved, e.g., is widened, by varying the inclined directions of the liquid crystal molecules 31.

As described above, in the liquid crystal display according to an exemplary embodiment, the inclination directions of the liquid crystal molecules 31 is different in a given pixel, based on the first branch 194a, the second branch 194b, the third branch 194c and the fourth branch 194d, such that the pixel is divided into subregions. Boundaries of the subregions are defined by the stems of the pixel electrode 191. Moreover, the width of the stems defining the boundary of the subregions of the pixel area increases or decreases from the central portion of the pixel electrode to the peripheral portion of the pixel electrode 191, such that the outer line of the stems is inclined with respect to the central line bisecting the stems by the predetermined angle $\theta$ (FIG. 2). In an exemplary embodiment, the predetermined angle $\theta$ of the outer line is in a range of more than 0 degrees and less than about 2 degrees.

In addition, in another alternative exemplary embodiment, a plurality of the branches dividing the pixel area of the liquid crystal display into subregions may extend in the transverse direction and the longitudinal direction, and a given stem which connects the branches to each other and is a boundary dividing the subregions of the pixel area, and is formed in a substantially oblique direction. Moreover, like the longitudinal stem 192 and the transverse stem 193 described in greater detail above, the width of the stem increases or, alternatively, decreases from the stem to the outer part of the pixel electrode such that the outer line of the stem is inclined with respect to an imaginary central line bisecting the stem by the predetermined angle $\theta$ (FIG. 2). In an exemplary embodiment, the predetermined angle $\theta$ of the outer line is in a range of more than 0 degrees and less than about 2 degrees.

In the liquid crystal display according to an exemplary embodiment, both outer lines of the longitudinal stem 192 and the transverse stem 193 of the pixel electrode 191 are inclined with respect to the outer line of the pixel electrode 191 by the predetermined angle $\theta$ such that intervals between the longitudinal stem 192 and the transverse stem 193, and the first branch 194a, the second branch 194b, the third branch 194c and the fourth branch 194d and the outer connection 195, are smoothly curved such that the direction of the liquid crystal molecules 31 near the longitudinal stem 192 and the transverse stem 193 and the outer connection 195 of the pixel electrode 191 is controlled, thereby substantially reducing a texture generated on portion thereof. Also, the liquid crystal molecules 31 near the longitudinal stem 192 and the transverse stem 193 and the outer connection 195 of the pixel electrode 191 are controlled such that a total response speed of the liquid crystal layer 3 is substantially increased.

The pixel electrode 191 and the common electrode 270 form a liquid crystal capacitor to maintain the voltages applied to the pixel electrode 191, even after the TFT is turned off.

In addition, the pixel electrode 191 overlaps the storage electrode 137 to form a storage capacitor, and the storage capacitor enhances voltage storage capacity of the liquid crystal capacitor.

In the liquid crystal display according to an exemplary embodiment, the storage electrode 137 overlapping the pixel electrode 191 to form the storage capacitor is includes a transparent conductive layer such that an aperture ratio of the liquid crystal display is not deteriorated when the storage electrode 137 is increased in size to increase a capacitance of the storage capacitor.

Figure 6:
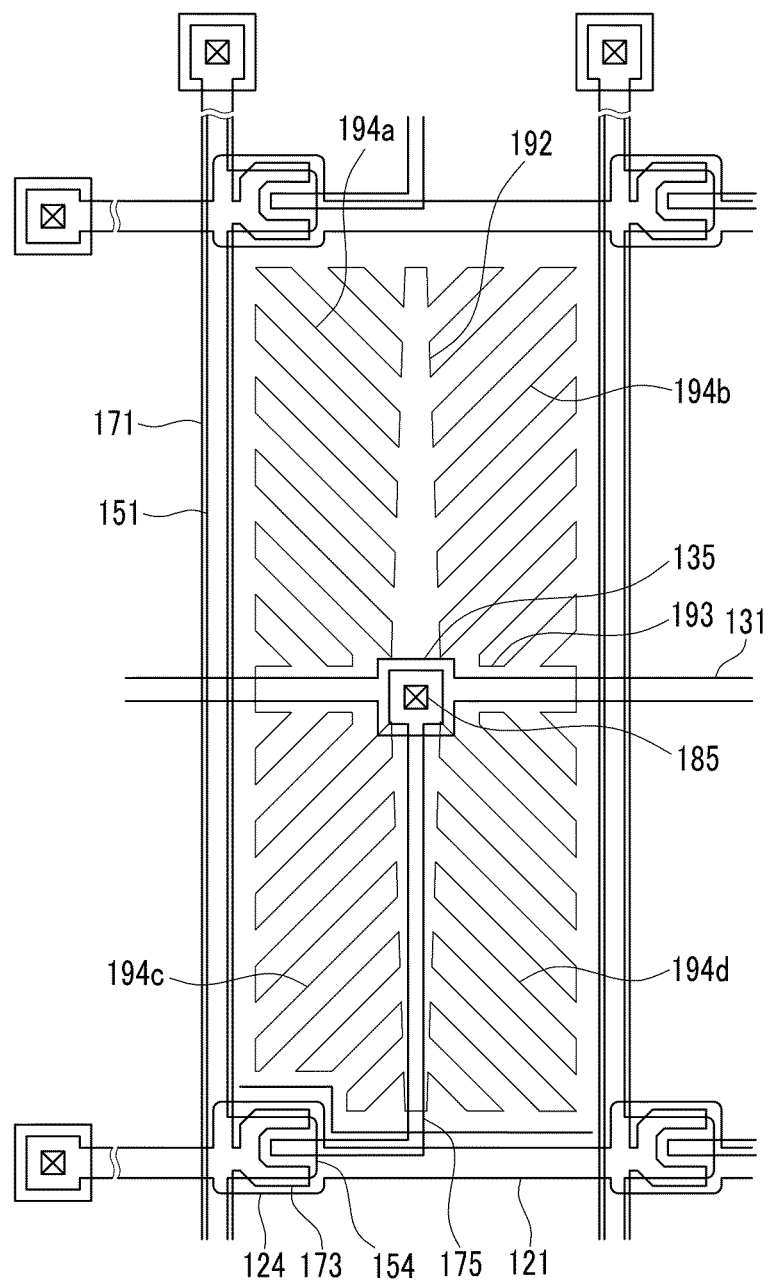
FIG. 6 is a layout view of another alternative exemplary embodiment of a liquid crystal display according to the present invention.

Hereinafter, a liquid crystal display according to an alternative exemplary embodiment will be described in further detail with reference to FIG. 6. FIG. 6 is a layout view of an alternative exemplary embodiment of a liquid crystal display according to the present invention.

A structure of a liquid crystal display according to an exemplary embodiment shown in FIG. 6 is substantially the same as in the exemplary embodiment shown in FIGS. 4 and 5, and any repetitive detailed description thereof will be omitted.

Storage electrodes 137 made of a transparent conductive material are disposed on a substrate 110, and gate lines 121 and storage electrode lines 131 are disposed on the substrate 110 and the storage electrodes 137.

Semiconductors stripes 151 are disposed on the gate lines 121 and the storage electrode lines 131, and ohmic contacts (FIG. 5) are disposed on the semiconductor stripes 151. Data lines 171, including source electrodes 173, and drain electrodes 175 are disposed on the ohmic contacts and a gate insulating layer 140.

A passivation layer 180 (FIG. 5) having contact holes 185 formed therein, exposing the drain electrodes 175 is disposed on the data lines 171, the drain electrodes 175 and exposed portions of the semiconductor stripes 151.

A shape of the pixel electrode 191 of the liquid crystal display according to an exemplary embodiment is a quadrangle, and the pixel electrode 191 includes a cross-shaped stem having a transverse stem 193 and a longitudinal stem 192, and a first branch 194a, a second branch 194b, a third branch 194c and a fourth branch 194d extending from the transverse stem 193 and the longitudinal stem 192 in different directions therefrom.

In contrast to the exemplary embodiment of the pixel electrode 191 shown in FIGS. 4 and 5, the pixel electrode 191 according to an alternative exemplary embodiment shown in FIG. 6 does not have the outer connection 195 for connecting the outer portions of the pixel electrode 191.

A width of the longitudinal stem 192 of the pixel electrode 191 of the liquid crystal display according to an exemplary embodiment decreases closer to the upper and lower outer portions of the pixel electrode 191 from the transverse stem 193. Accordingly, the outer line of the longitudinal stem 192 is inclined with respect to the outer line of the pixel electrode 191 by a predetermined angle θ (FIG. 2. In an exemplary embodiment, the predetermined angle θ of the outer line of the longitudinal stem 192 is in a range of more than 0 degrees and less than about 2 degrees. Also, in yet another alternative exemplary embodiment, a width of the transverse stem 193 of the pixel electrode 191 decreases closer to the outer connection 195 from the longitudinal stem 192.

Thus, in the liquid crystal display according to an exemplary embodiment, both outer lines of the longitudinal stem 192 and the transverse stem 193 of the pixel electrode 191 are inclined with respect to the outer line of the pixel electrode 191 by the predetermined angle θ such that intervals between the longitudinal stem 192 and the first branch 194a, the second branch 194b, the third branch 194c and the fourth branch 194d are smoothly curved and a direction of the liquid crystal molecules 31 near the longitudinal stem 192 of the pixel electrode 191 is controlled, thereby substantially reducing a texture generated on a portion thereof. Also, the liquid crystal molecules 31 near the longitudinal stem 192 and the transverse stem 193 are controlled such that a response speed of the liquid crystal layer 3 is substantially increased.

In the liquid crystal display according to an exemplary embodiment, the storage electrode 137 overlaps the pixel electrode 191 to form a storage capacitor which is formed of a transparent conductive layer. Accordingly, an aperture ratio is not deteriorated even though the storage electrode 137 is increased in size to increase a capacitance of the storage capacitor.

Figure 7:
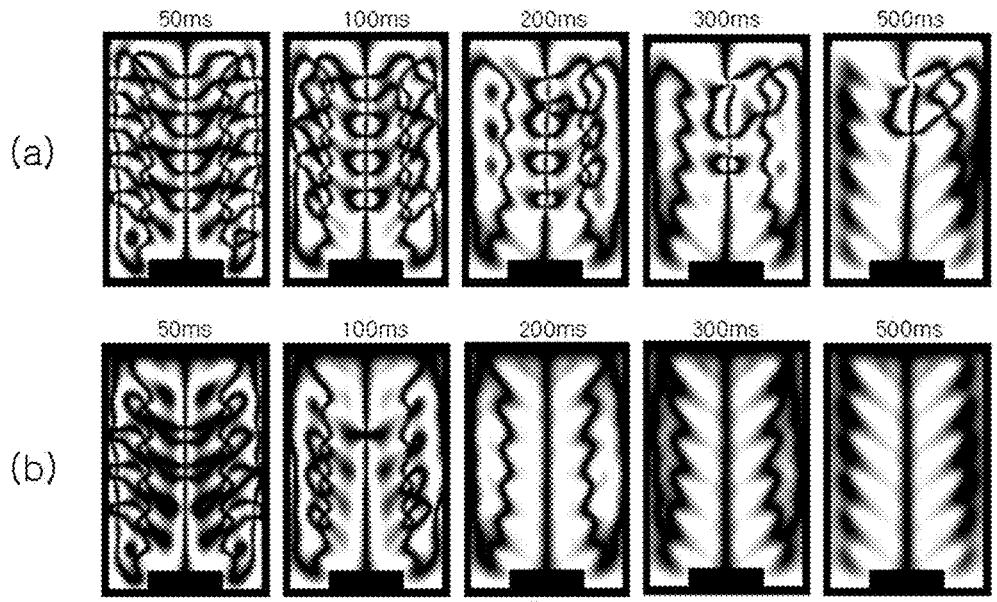
FIGS. 7 to 9 are microphotographs showing experimental results of an exemplary embodiment of an operation of a liquid crystal display according to the present invention.
Figure 8:
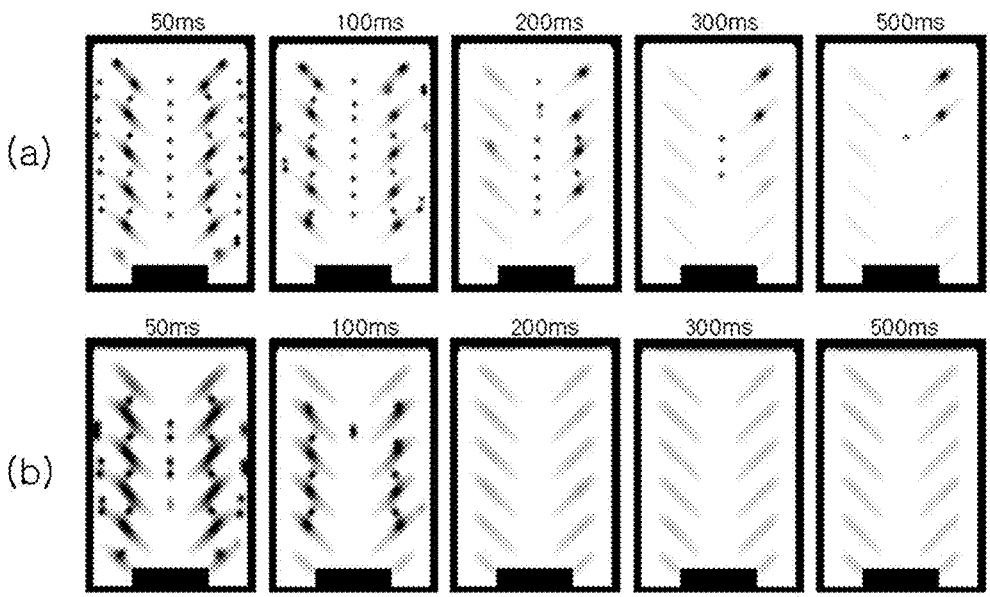
Figure 9:
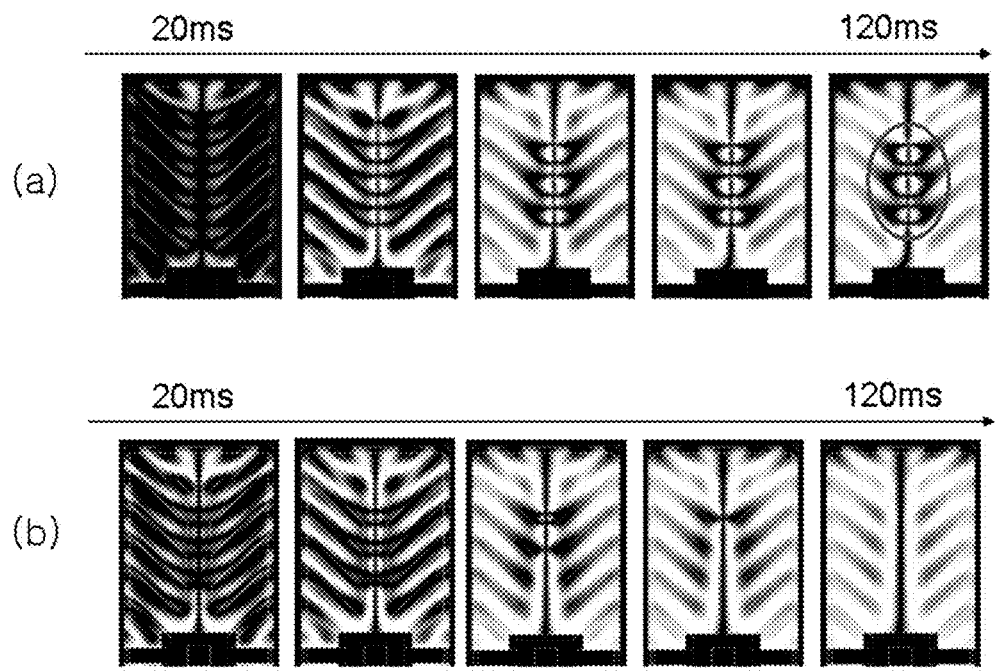

Hereinafter, a texture control and a response speed of a liquid crystal display according to an exemplary embodiment of the present invention will be described with reference to FIGS. 7 to 9. FIGS. 7 to 9 are microphotographs showing experimental results of an exemplary embodiment of an operation of a liquid crystal display according to the present invention.

In the experimental example shown in FIGS. 7 to 9, a case (a) in which the longitudinal stem 192 of the pixel electrode 191 is formed to have equal widths, and a case (b) in which the pixel electrode 191 is formed with the shape according to the exemplary embodiments described in greater detail above with reference to FIGS. 1 and 3, are illustrated, and operations over time of the liquid crystal display are measured after the application of a same voltage. The results are then compared to each other in the microphotographs. Conditions other than the shape of the outer portion of the longitudinal stem 192 of the pixel electrode 191 are the same in FIGS. 7 to 9. In the case (b), the inclined angle θ of the outer line of the longitudinal stem 192 with respect to the outer line of the pixel electrode 191 is about 1.2 degrees.

FIG. 7 represents operation of the liquid crystal display over time after attaching a linear polarizer to the liquid crystal display for the case (a), in which the longitudinal stem 192 of the pixel electrode 191 has a constant width, and the case (b) in which the pixel electrode 191 is formed with the shape of the exemplary embodiment shown FIG. 1.

Referring to FIG. 7, in the case (a) in which the longitudinal stem 192 of the pixel electrode 191 has a uniform width, arrangement directions of the liquid crystal molecules 31 change substantially on a main edge of the longitudinal stem 192 and an outer portion of the pixel electrode 191, particularly on the right-upper portion of the microphotographs. However, in the liquid crystal display according to an exemplary embodiment in the case in which the width of the longitudinal stem 192 of the pixel electrode 191 is decrease closes to the outer portion of the pixel electrode (as described in greater detail above and shown in FIG. 1), the arrangement directions of the liquid crystal molecules 31 are substantially uniform, and a time in which the liquid crystal molecules 31 are arranged is thereby substantially improved. Accordingly, in the liquid crystal display according to an exemplary embodiment, wherein the width of the longitudinal stem 192 of the pixel electrode 191 decrease closer to the outer portion of the pixel electrode 191, the arrangement of the liquid crystal molecules 31 is uniform, and a response speed is thereby substantially increased.

FIG. 8 represents operation of the liquid crystal display over time after attaching a circular polarizer to the liquid crystal display for the case (a) in which the longitudinal stem 192 of the pixel electrode 191 has a uniform width, and the case (b) in which the pixel electrode 191 is formed with the shape according to the exemplary embodiment shown in FIG. 1.

Referring to FIG. 8, in the case (a) in which the longitudinal stem 192 of the pixel electrode 191 has the uniform width, a singular point at which the arrangement direction of the liquid crystal molecules 31 are changed is generated on the main edge of the longitudinal stem 192 and the outer portion of the pixel electrode 191, particularly on the right upper portion.

However, in the liquid crystal display according to an exemplary embodiment, wherein the width of the longitudinal stem 192 of the pixel electrode 191 decrease closes to the outer portion of the pixel electrode 191 (as shown in the exemplary embodiment in FIG. 1), a singular point at which the portion where the arrangement directions of the liquid crystal molecules 31 are changed is not generated, and a time in which the liquid crystal molecules 31 are arranged is thereby substantially improved. Accordingly, in the liquid crystal display according to an exemplary embodiment, when the width of the longitudinal stem 192 of the pixel electrode 191 is decrease toward the outer portion of the pixel electrode 191, the arrangement of the liquid crystal molecules 31 is substantially uniform, and a response speed is thereby substantially increased.

FIG. 9 represents operation of the liquid crystal display over time after attaching a linear polarizer to the liquid crystal display for the case (a) in which the longitudinal stem 192 of the pixel electrode 191 has a uniform width, and the case (b) in which the pixel electrode 191 is formed with the shape of the exemplary embodiment shown in FIG. 3.

Referring to FIG. 9, in the case (a) in which the longitudinal stem 192 of the pixel electrode 191 has the uniform width, the arrangement directions of the liquid crystal molecules are substantially changed near the longitudinal stem 192, as indicated by a circle in FIG. 9.

However, in the liquid crystal display according to an exemplary embodiment, in a case in which the width of the longitudinal stem 192 of the pixel electrode 191 decreases closer to the outer portion of the pixel electrode 191, as in the exemplary embodiment shown in FIG. 3, the singular point at which the arrangement directions of the liquid crystal molecules 31 are substantially changed near the longitudinal stem 192 is not generated, and a time in which the liquid crystal molecules 31 are arranged is substantially improved. Accordingly, in the liquid crystal display according to an exemplary embodiment, when the width of the longitudinal stem 192 of the pixel electrode 191 decreases toward the outer portion of the pixel electrode 191 such that the arrangement of the liquid crystal molecules 31 may be substantially uniform, a response speed is thereby substantially increased.

Thus, according to exemplary embodiments of a liquid crystal display, the liquid crystal molecules 31 are stably arranged such that a texture generated near the edge portions of the pixel electrode 191 and the longitudinal stem 192 of the pixel electrode 191 are effectively prevented. Accordingly, in the liquid crystal display according to an exemplary embodiment, a deterioration of display quality due to the texture is substantially reduced and/or is effectively prevented.

The present invention should not be construed as being limited to the exemplary embodiments set forth herein. Rather, these exemplary embodiments are provided so that this disclosure will be thorough and complete and will fully convey the concept of the present invention to those skilled in the art. For example, in an alternative exemplary embodiment, a method of manufacturing a liquid crystal display includes: disposing a first substrate to face a second substrate; forming a gate line and a data line on the first substrate; forming a pixel electrode having subregions on the first substrate; connecting the pixel electrode to the gate line and the data line; forming a storage capacitor having a transparent conductive layer by overlapping a storage electrode with the pixel electrode on the first substrate; forming a common electrode on the second substrate; and disposing a liquid crystal layer including liquid crystal molecules between the pixel electrode and the common electrode. The pixel electrode includes a stem defining boundaries between the subregions, and a width of the stem changes from a center portion of the pixel electrode a peripheral portion of the pixel electrode.

While the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
a first substrate and a second substrate facing the first substrate;
a gate line and a data line disposed on the first substrate;
a thin film transistor connected to the gate line and the data line;
a pixel electrode disposed on the first substrate, connected to the gate line and the data line, and including subregions;
a storage electrode disposed on the first substrate overlapping the pixel electrode to form a storage capacitor;
a common electrode disposed on the second substrate; and
a liquid crystal layer interposed between the pixel electrode and the common electrode and including liquid crystal molecules disposed therein,
wherein the pixel electrode is defined by
a cross-shaped stem having a transverse stem and longitudinal stem crossing the transverse stem; and
a plurality of minute branches extending from the cross-shaped stem toward the peripheral portion of the pixel electrode, and
wherein the stem has a width increasing from one edge of the pixel electrode to a center portion of the cross-shaped stem and subsequently decreasing from the center portion of the cross-shaped stem to another edge of the pixel electrode.

2. The liquid crystal display of claim 1, wherein lengths of two or more of the branches in each of the subregions are different from each other.

3. The liquid crystal display of claim 2, wherein the liquid crystal molecules are pretilted such that a longitudinal axis of the liquid crystal molecules in each of the subregions is aligned substantially parallel to the lengths of the two or more of the branches therein.

4. The liquid crystal display of claim 3, further comprising an alignment layer disposed on one of the pixel electrode and the common electrode,
wherein the alignment layer is aligned substantially parallel to the lengths of the two or more of the branches.

5. The liquid crystal display of claim 1, wherein the pixel electrode further includes an outer connection surrounding the peripheral portion of the pixel electrode.

6. The liquid crystal display of claim 5, wherein the branches of the pixel electrode are connected to the outer connection.

7. The liquid crystal display of claim 5, wherein lengths of two or more of the branches in each of the subregions are different from each other.

8. The liquid crystal display of claim 7, wherein the liquid crystal molecules are pretilted such that a longitudinal axis of the liquid crystal molecules in each of the subregions are aligned substantially parallel to the lengths of the two or more of the branches therein.

9. The liquid crystal display of claim 1, wherein the storage electrode comprises a transparent conductive layer.

10. The liquid crystal display of claim 9, wherein
a storage electrode line is disposed in a same layer as the gate line, and
the storage electrode line is connected to the storage electrode.

11. The liquid crystal display of claim 1, further comprising a storage electrode line disposed in a same layer as the gate line, wherein the storage electrode line is connected to the storage electrode.

12. The liquid crystal display of claim 1, wherein the pixel electrode further includes branches extending from the one of the longitudinal stem and the transverse stem toward the peripheral portion of the pixel electrode.

* * * * *